United States Patent [19]
Herter

[11] 3,978,978
[45] Sept. 7, 1976

[54] APPARATUS FOR CONVEYING PARTICULATE MATERIALS

[76] Inventor: Martin Herter, Amdriesch 19, B-5021 Geyen, Germany

[22] Filed: June 9, 1975

[21] Appl. No.: 584,982

Related U.S. Application Data

[63] Continuation-in-part of Ser. No. 338,972, March 7, 1973, abandoned.

[30] Foreign Application Priority Data

Mar. 10, 1972  Germany............................ 2211549

[52] U.S. Cl. .............................. 198/601; 415/72; 417/900; 198/629; 198/674; 198/722
[51] Int. Cl.² .................. B65G 33/00; F04D 3/02; F04B 15/02
[58] Field of Search ............... 198/64, 213; 415/72; 417/900; 302/27, 50; 92/132, 110, 112; 222/135, 404

[56] References Cited
UNITED STATES PATENTS

| | | | |
|---|---|---|---|
| 2,556,392 | 6/1951 | Hawk | 198/213 |
| 3,115,681 | 12/1963 | Hendry | 198/64 |
| 3,152,522 | 10/1964 | Burden et al. | 92/112 |
| 3,490,341 | 1/1970 | Sessody | 92/132 |
| 3,574,409 | 4/1971 | Furstenberg | 302/27 |
| 3,716,304 | 2/1973 | Coles | 198/64 |

FOREIGN PATENTS OR APPLICATIONS

| | | | |
|---|---|---|---|
| 1,140,340 | 11/1962 | Germany | 198/213 |

Primary Examiner—Evon C. Blunk
Assistant Examiner—Joseph E. Valenza
Attorney, Agent, or Firm—Anthony J. Casella

[57] ABSTRACT

A section of a conveying pipe accommodates a conveyor screw, and drives are provided for rotating this conveyor screw as well as axially reciprocating it in the pipe section.

6 Claims, 10 Drawing Figures

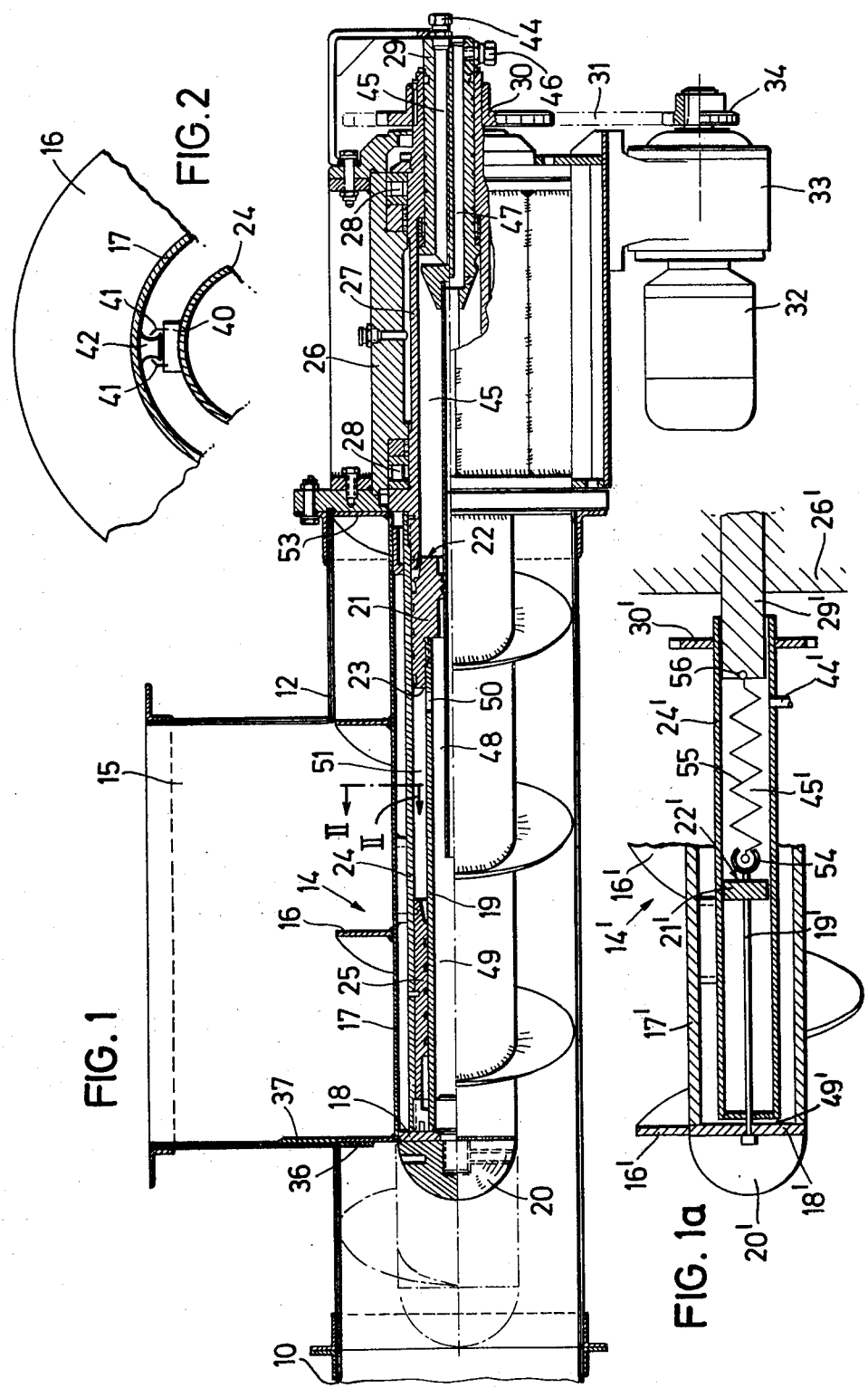

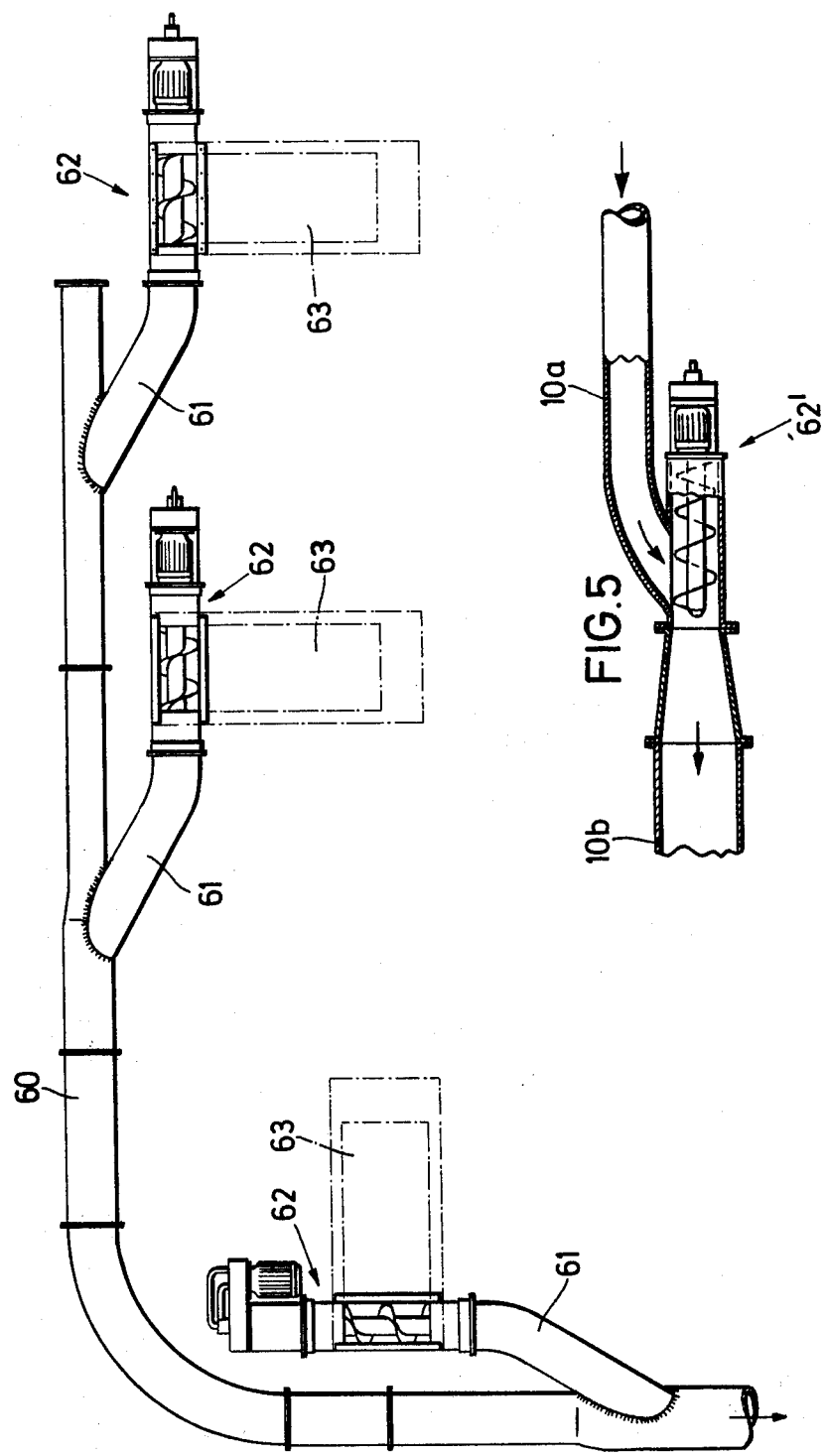

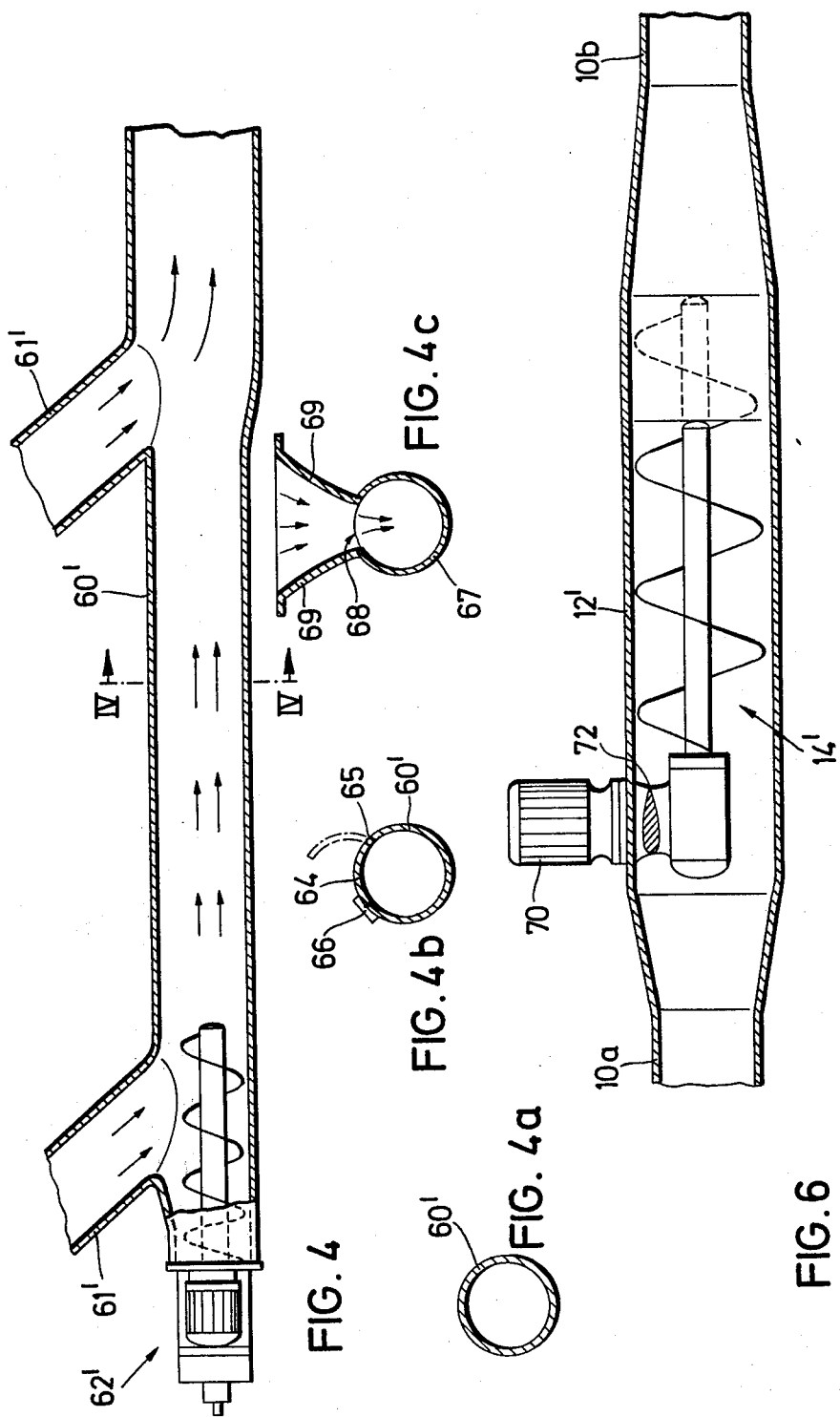

APPARATUS FOR CONVEYING PARTICULATE MATERIALS

CROSS REFERENCES TO RELATED APPLICATION

This a continuation-in-part application of U.S. Pat. application Ser. No. 338,972 filed Mar. 7, 1973 now abandoned and entitled APPARATUS FOR CONVEYING PARTICULATE MATERIALS.

BACKGROUND OF THE INVENTION

The present invention relates generally to a conveying apparatus, annd more particularly to an apparatus for conveying particulate material. Still more particularly the invention relates to an apparatus for conveying particulate material which are of such type that they will pass on mechanical energy transmitted to them in forward direction with minimum loss.

Certain materials, for instance metal cuttings which originate in chip-removing machine tools, can be conveyed by subjecting them to energy which causes a certain amount of compression but which is then not further dissipated. In other words, after undergoing a certain amount of compression, such material will then advance (in the direction in which the energy acts) essentially in the manner of a solid body, without energy losses. Another type of material meeting this qualification is sludge which, just like a liquid, tends to convey energy transmitted to it in all directions but has a preferred energy transmission direction in a forward sense, that is in the direction in which the energy acts.

Other materials, for which the apparatus according to the present invention is not suitable and which are mentioned herein in order to make a clear distinction, include for example sand. If sand has energy supplied to it, in the sense of pressure trying to urge it in certain in a sand will become compressed but will thereafter not pass on the energy in the direction in which it acts, but instead will become increasingly compacted.

With this in mind it is pointed out that the prior art has long known screw conveyors utilizing a pipe in which a worm screw rotates. The interior surface of the pipe is usually so profiled that the material conveyed by the screw is prevented from rotating with the latter in the pipe, and is constrained largely to advance only in the direction of rotation of the pipe. That is, the screw rotates with reference to the pipe as well as with reference to the materials being conveyed. This causes the material to slide forwardly through the pipe within the slides of the screw thread and thereby to be conveyed. A problem with conventional screw conveyors is that the screw must extend over substantially the entire length of the pipe through which material is to be conveyed by it, because the screw produces only minimal compression of the material being conveyed and must therefore be present at all points at which a conveying action is required. Of course, there are many instances in which it is possible to install, the result being that the application of screw conveyors is strictly limited by this factor.

SUMMARY OF THE INVENTION

It is, accordingly, a general object of the present invention to provide an improved apparatus of the screw-conveyor type for conveying of particulate materials.

More specially it is an object of the present invention to provide such an improved apparatus which is capable of conveying certain materials even over long distances. The materials must be of the type which has been outlined in the introduction to the specification as being suitable for use with the novel apparatus, i.e., they cannot be of the type exemplified by the mention of sand earlier herein.

An additional object of the invention is to provide an apparatus which is capable of not only conveying the materials but also, if necessary, of compressing and comminuting them.

Another object of the invention is to provide such an apparatus whose rate of delivery per unit of time is constant, so that the apparatus can also be used for quantitatively dispensing the material.

An additional object of the invention is to provide such an apparatus which is capable of supplying several different types of material to a common conveyor conduit.

In keeping with these objects, and others which will become apparent hereafter, one feature of the invention resides, briefly stated, in apparatus for conveying particulate material which comprises a pipe, a conveyor screw arranged in a portion of this pipe, first means for effecting rotation of said conveyor screw, and second means for effecting axial reciprocation of said conveyor screw at least during rotation of the same.

It is currently preferred that the first and second means, that is first and second drives for effecting rotational and axial displacement of the conveyor screw, be so coordinated with one another that during the axial retraction of the screw which takes place at a rate that is rapid compared with the rate of axial advancement — the conveying of the material continues in forward direction without interruption as a result of continued rotation of the screw. In other words, the screw is rotated continuously in a sense effecting forward conveying of the material and at a rotary speed so selected that even when the screw is axially retracted at a rate that is much more rapid than its rate of forward advancement, the material continues to be moved in forward direction. The result of this is that the material is advanced with a kind of pulsing effect.

The pipe through which the material is conveyed requires no profiling on its inner surface and may be very long by comparison with the length of the conveying screw. The principle of operation of the apparatus is that the material becomes compressed by friction relative to the wall of the pipe and the flights of the conveyor screw, and as soon as the rate of compression reaches a certain level, the combined rotational and axial advancement of the screw introduced sufficient energy into the material to cause the same to advance with a minimal loss of energy, leading to the material being conveyed over very long distances in the pipe. The degree of compression achieved in the material in the pipe is extraordinarily regular as a function of the various parameters (e.g., the nature of the material, the wall friction, the cross-section of the pipe, the pipe run and the screw drive), so that the rate at which material is conveyed through the pipe is so regular that the apparatus according to the present invention can be used for dispensing metered quantities of the material.

According to one concept of the invention that section of the pipe in which the screw is located may be provided with an inlet for the incoming material to be conveyed, the inlet being located in the region of the forward end of the screw when the latter is in its retracted position. The rear end of the pipe may be open and a closure plate may be provided directly on the rear end of the screw itself. The material to be conveyed can be fed laterally to the forward end of the retracted conveyor screw. The inlet can be funnel-shaped and is advantageously so constructed and located at the upper side of the pipe that the entry of the material into the flights or threads of the screw is encouraged, while a forcing-out of the material from the flights during axial retraction of the screw is prevented.

This particular embodiment of the apparatus according to the present invention can also be used if the conveyor pipe is so long that a further supply of conveying energy to the material is required along the way. However, and particularly in the case of this latter type of use, it is also possible for the pipe section containing the screw to be disposed between two sections of the conveyor pipe through which material is to be conveyed, so that the material is introduced first into one pipe (wherein it may be advanced by a first screw) and then reaches the rear end of a second screw located in an intermediate pipe section, which second screw then imparts additional energy to the material and conveys the latter through the pipe section located downstream of the second screw.

A further embodiment of the invention envisions the provision of a plurality of conveyor pipes, each provided with at least one of the conveying screws and capable of receiving material, and of course different materials can be introduced into the different pipes if and when necessary. These pipes may discharge at an acute angle into a single main conveying conduit. This makes it possible, for instance, to connect a large number of material sources — for instance a plurality of chip-producing machine tools — with a common main conveying conduit.

It is emphasized that the term "conveying pipe" as used herein and in the accompanying claims is intended to embrace not only the classical definition of a pipe, that is a circumferentially complete conduit, but also other channels or the like through which the material can be conveyed, for instance a channel having an open upper side or top. Such a pipe or channel may be open at the top over an angle of for example 90° or less and provided with a funnel-shaped obliquely upwardly extending side walls.

In some instances it may be necessary or desirable to comminute the material being conveyed. In such a case it is possible to mount a cutter device on the single or several foremost flights or turns of the screwthread, and to mount a counter-acting cutting device on an edge of the inlet opening through which material is admitted into the pipe.

Rotational and axial movement can be imparted to the screw in various different ways already known to those skilled in the art. For instance, rotation can be imparted mechanically via an electromotor, but it can also be provided hydraulically, pneumatically or otherwise. The axial drive may be constructed with a double-acting piston and cylinder unit. It may be completely hydraulic, it may be pneumatic, it may use a single-acting cylinder and piston unit providing only for the forward movement of the screw, in which case retraction can be achieved by suitable restoring means such as a spring which is stressed during the forward movement of the screw.

The novel features which are considered as characteristic for the invention are set forth in particular in the appended claims. The invention itself, however, both as to its construction and its method of operation, together with additional objects and advantages thereof, will best be understood from the following description of specific embodiments when read in conjunction with the accompanying drawing.

BRIEF DESCRIPTION OF THE DRAWING

FIG. 1 is a somewhat diagrammatic longitudinal section through an apparatus according to the present invention, with parts broken away for the sake of clarity;

FIG. 1a is a view similar to FIG. 1 but of a further embodiment of the invention;

FIG. 2 is a section taken on line II—II of FIG. 1;

FIG. 3 is a top-plan view of a further embodiment of the invention;

FIG. 4 is a fragmentary somewhat diagrammatic longitudinal section through a portion of an embodiment analogous to but somewhat different from that in FIG. 3;

FIGS. 4a–4c are somewhat diagrammatic cross-sectional views (all taken on a line corresponding to line IV—IV of FIG. 4), indicating different possible sectional configurations of the conveyor pipe;

FIG. 5 is a fragmentary partially sectioned view of a further embodiment; and

FIG. 6 is a view analogous to FIG. 5 illustrating an additional embodiment of the invention.

DESCRIPTION OF THE PREFERRED EMBODIMENTS

Discussing firstly the embodiment in FIGS. 1 and 2 it will be seen that only a short portion of the conveyor pipe 10 is illustrated. The pipe here has an internal smooth cylindrical surface and is very long. The pipe may not only be straight, but it may be curved as needed. At the inlet end of the pipe 10 there is provided a short pipe section 12 containing the conveyor screw 14 which serves to convey the material. On its other side, in the region of the leading end of the axially retracted screw 14, the pipe section 12 is provided with an inlet opening 15 though which the material to be conveyed is admitted. Advantageously, the inlet opening 15 will be funnel-shaped and is so constructed, asymmetrically with reference to the vertical central plane passing through the pipe section 12, that the incoming material is fed not only from above but also from laterally of the screw 14 where the threads or flights 16 of the screw extend from the top downwardly. On the other side, where the threads of the screw extend upwardly, the pipe section 12 substantially encloses the thread 16. This arrangement encourages the entry of the incoming material between the threads 16 of the screw 14 and at the same time prevents the material already located between the threads 16 from passing back into the inlet opening 15 when the screw 14 is axially retracted.

The threads 16 are provided with a tubular element 17 which is rigidly connected to an end plate 18 that is in turn connected to a tubular screw spindle 19. A hemispherical nut 20 provides a smooth closure at the outer side of the end plate 18. At the rear of the spindle 19 there is rigidly mounted an annular piston 21 having axially spaced ends 22 and 23 and being arranged for double-acting operation so that by appropriate admission of pressurized medium to bear against either the side 22 or the side 23, the piston 21 will effect axial advancement and axial retraction of the screw 14, respectively.

A fixed housing 26 has mounted in it a tubular member 27 for rotation in roller bearings 28. At the rear end of the member 27 is mounted a chain wheel 30 for driving the member 27 in rotation. At the front end of the member 27 is provided a tube 24 which extends coaxially between the members 17 and 19 and is rotated by the tubular member 27. On its inner side, close to its forward end, the pipe 24 is provided with an annular guide member 25 which supports the spindle 19, and fitted into the rear end of the tubular member 27 and rigid with a machine frame is a core piece 29 about which the tubular member 27 rotates. The piece 29 contains the supply lines for fluid to be applied to the annular piston 21. A chain 31 drives the chain wheel or sprocket 30 and meshes in turn with a sprocket 34 on the output shaft of a gear transmission 33 which is driven a motor 32, the latter together with the transmission 33 being mounted on the fixed housing 26.

On at least one point of the periphery of pipe 24 and on a mounting 40 on the outside thereof, there is provided a pair of rails 41 between which there protrudes a guide member 42 which is mounted on the inner side of the member 17. With this construction it is possible for the screw 14 to be driven via the tube 24 in the direction of rotation, while at the same time the screw performs its axial or reciprocatory movements in forward and rearward directions.

A connecting nipple 44 communicates with a duct 45 of the core piece 29 and which in turn communicates with the interior of the tubular member 27. A non-illustrated line for supply of pressurized medium communicates with the nipple 44 so that fluid pressure can be applied to the end 22 of the piston 21. A further nipple 46 is provided on the core piece 29 and can receive pressurized fluid which is to transmit pressure to the opposite end 23 of the piston 21. The nipple 46 communicates 47 and the core piece 29 which in turn communicates with the tube 48 which is located axially within the screw 14 and from which the pressurized fluid passes into the interior 49 of the spindle 19 in order to pass from there through one or more radial bores 50 into the cylinder space 51 between the member 24 and the spindle 19. At its rear end the screw 14 is closed by a plate 53 which is located in a radial plane and which, during the forward movement of the screw 14, prevents material from penetrating into the space located behind the plate 53.

The operation of the apparatus thus far described will already be understood from what has been set forth. The material to be conveyed, for instance metal chips from a machine tool, is fed through the inlet 15. Initially, the motor 32 causes the screw 14 to rotate, thus conveying the metal chips into the pipe 10 which it is assumed will be empty at first and will then slowly fill up with conveyed chips. If cutters 36 are provided on the screw 14, cooperating with a further cutter 37 on that side of the inlet 15 which is located towards the pipe 10, then the incoming material can be further reduced in size by cooperation of the cutters 36 and 37 with one another.

As more and more metal chips are admitted into the pipe 10 they will gradually fill that region of it which is adjacent the leading end of the screw 14. By virtue of their friction with respect to the wall of the pipe 10, they will impart a certain resistance to the subsequently incoming chips, resulting in a compression of the chips already in the pipe 10. When the thus compressed mass of chips extends approximately as far as the leading end of the screw 14, which at this point is retracted as shown in FIG. 1, pressure medium is applied into the space 45 and against the end 22 of the piston 21, and the screw 14 which continues to rotate is now also shifted forwardly (towards the left in FIG. 1) to the position indicated in broken lines. By virtue of this working stroke or forward movement of the screw 14, and its continued rotation during such movement which results in the continued forward conveyance of additional metal chips, and by virtue of the particular characteristic exhibited by such a mass and which has been described in the introduction to the present specification, the advancing screw 14 propels the compressed mass through the pipe 10. It has been found that in this manner the mass can be easily and reliably conveyed over considerable lengths of pipe.

When the screw 14 has reached its extreme advanced position (the extreme left-hand position of FIG. 1), meaning that it can no longer move forwardly, the space 45 is relieved of pressure and at the same time pressure medium is admitted through the bore 47 into the space 49 and into the space 51, so that pressure is applied against the end 23 of the piston 21. This causes the piston to be retracted to the solid-line position of FIG. 1, with such retraction being relatively rapid as compared with the speed of advancing movement. The screw continues, however, to rotate and the speed of rotation and the speed of retraction are so correlated with one another that during the retraction of the screw 14 the material continues to be advanced forwardly by the screw flights 16 in the direction of material conveyance. The above described operating cycle is now repeated. It is evident that the material being conveyed through the conveyor pipe 10 will thus undergo a completely uniform consolidation and compression, and will be propelled at a constant rate of delivery through the pipe 10 over even very long distances. The rate of delivery is, in fact, so regular that the apparatus according to the present invention can be used for dispensing metered quantities of the material from an outlet of the pipe 10.

The embodiment in FIG. 1a is analogous to that of FIGS. 1 and 2 except that in this embodiment, wherein like primed reference numerals designate like elements as in the preceding embodiment, the axial retraction of the screw is achieved by means of a spring 55. One end of the spring 55 is attached at 56 to the core piece 29' and the other end of the spring is attached at 54 to the piston 21' by means of a rotary connector or joint. The piston and cylinder unit is here clearly of the single-acting type, that is when the screw and the piston are to be advanced in forward direction, the end 22' of the piston 21' has pressure applied to it which results in forward movement of the piston and of the screw and in concomitant tensioning of the spring 55. When the supply of pressurized medium to the space 45' is terminated, the retractile tendency of the spring 55 draws the piston 21 and the associated screw back to the starting position thereof. For the sake of differentiation the other elements in the embodiment of FIG. 1a which are the same as those in FIG. 1 have all been provided with identical reference numerals to which a prime symbol has been added.

In the embodiment of FIG. 1a, the chamber 49' forwardly of piston 21' is filled with gas which becomes compressed when the piston moves forwardly, and which expands and aids rearward movement of the piston when the application of pressure to the end 22 is terminated.

Coming now to FIGS. 3 and 4 it will be seen that in FIG. 3 a plurality of supply sources, which may be machine tools, has been illustrated diagrammatically at 63. It is assumed that these machine tools produce metal chips which must be carried away. Of course any other sources of material to be conveyed may be involved as long as the materials meet the particular requirements outlined in the introduction to the specification.

If metal chips are produced, and are to be carried off, they are placed into the inlet funnel of apparatuses according to FIGS. 1a or FIG. 1, which are designated generally with reference numeral 62. In these apparatuses the respective screws convey the metal chips through pipes 61 into a common or main conveyor conduit 60, the angle at which the pipes 61 join the conduit 60 being such that the conveying energy supplied by the individual screws takes effect in the main conduit 60. The diameter of the latter must, at the connection with the individual pipes 61, increase in accordance with the quantity of additional material supplied if, as is usually the case, the incoming portion of the conduit 60 is already completely filled with compressed chips at the point at which a new pipe 61 communicates with it.

The embodiment of FIG. 4 differs somewhat from that of FIG. 3 in that here the main conduit 60' is provided with an arrangement according to the present invention (designated with reference numeral 62') in such a manner as to entrain the incoming metal chips or other material which arrive from the conveyor pipe 61' that is located downstream of the arrangement 62' so as to entrain this material in the manner of a jet pump.

As FIG. 4a shows, the conveyor pipe 10 and the main conveyor conduits 60, 60' will be of closed cylindrical configuration. However, it is shown in FIG. 4b that they may also be of different cross-sectional form and that a part of the wall may be constructed as a flap 64 which can be opened about a hinge 65 and which can be locked by means of a fastener 66. In this way the interior of the pipe or conduit becomes accessible if required, for example in the event that the material being conveyed should have become solidified into a mass and must be broken up to permit further conveying. Such "clogging" could for instance occur in the event the apparatus is temporarily shut down and then started up again.

FIG. 4c shows that the conveyor pipe or conduit may also be in the form of a channel 67 having an open upper side 68 which is laterally bounded by funnel-like side walls 69. Even if the cross-sectional configuration is as shown in FIG. 4c, the material being conveyed will normally remain within the outlines of the cross-section of the conduit. However, should part of the material happen to be pushed upwards between the side walls 69, this part will subsequently be drawn downwardly again, particularly by the additional material which is being advanced by the conveyor screw, as long as the material being conveyed is less consolidated than the pushed-up material. The material to be conveyed may be introduced between the side walls 69 and entrained in the manner of jet pump by the material being conveyed in the channel 67.

If the material is to be conveyed over extraordinarily long distances, it may be necessary to supply additional conveying energy to it. Thus, the material would be advanced by one screw over a certain distance and would then receive additional energy from another screw to carry it forward an additional distance. FIGS. 5 and 6 shown two embodiments which can be used for this purpose.

In FIG. 5 I have illustrated an embodiment in which the incoming conveyor pipe 10a discharges into a screw arrangement generally designated 62', the inlet thereto being located at the same point where in FIGS. 1 and 1a the inlet 15 is provided. Thus, the screw of the arrangement 62' advances the material through the conveyor pipe 10b.

In FIG. 6 the pipe portion 12' is provided which is incorporated between an incoming and a further conveying pipe section 10a, 10b respectively. The screw 14' is coaxially arranged in the pipe section 12'. It is evident that the diameter of the pipe section 12' must be larger than that of the pipe section 10a, 10b in order to compensate for those of the cross-sectional area of the pipe section 12' which are occupied by the screw and its mounting. Drive motor 70 for driving the screw 14' may be located outside the pipe section 12', as shown in FIG. 6.

It should be understood that modifications are possible in the embodiments disclosed herein without departing from the intent and concept of the invention. It should also be understood that the term conveying is intended to designate not only the concept of transportation, that is the advancement of material from a point of origin to a point of disposal, but also refers to applications where material is to be conveyed for purposes of handling, for instance for dispensing, for mixing, for loosening-up, for washing, or the like.

It will be understood that each of the elements described above, or two or more together, may also find a useful application in other types of costructions differing from the types described above.

While the invention has been illustrated and described as embodied in an apparatus for conveying particular materials, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed is:

1. Apparatus for conveying-away metal chips or other materials, which transmit an energy initiated into them onwards in the direction of introduction of the energy with minimal loss, comprising a channel which extends from at least one material supply station to a remotely located material delivery station, and drive means for moving said materials through the channel, characterized in that the channel is an inwardly smooth conveying pipe (10), and the drive means includes a tubular housing (12) and a worm (14) rotating in said tubular housing (12) and reciprocably driven in axial direction, said worm including a worm tube and an axial drive disposed in said worm tube, said axial drive having a piston (21) which can be stressed on both sides with pressurized medium and which is disposed in the axis of the worm and is connected to the worm tube (17), the cylinder of which piston consists of an axially fixed tube (24) provided with a rotational drive (30–34), said fixed tube being disposed between the worm tube and the piston, while the pressurized medium supply line (48) extends centrally through the piston so that pressure can be applied to one side (23) of the piston.

2. Apparatus according to claim 1, characterized in that a plurality of branch conveyor pipes (61) coming from a material supply station (63) each merge, with a worm (62) connected thereinfront, into the conveying pipe (60) at an acute angle to the direction of conveyance.

3. Apparatus according to claim 1, characterized in that a plurality of branch conveyor pipes (61') merge into the conveyor pipe (60') provided with a worm (62') connected thereinfront at an acute angle to the direction of conveyance.

4. Apparatus according to claim 2, characterized in that the cross-section of the conveyor pipe (60, 60') is enlarged at the locations at which the branch conveyor pipes (61, 61') ) enter.

5. Apparatus according to claim 1, characterized in that a pipe portion (12') containing a worm (14') is connected into the conveyor pipe (10A, 10B).

6. Apparatus according to claim 1 characterized in that the conveyor pipe (67) is open at the top in the region of an angle of approximately 90° or less and is provided with funnel-shaped obliquely upwardly extending side walls (69).

* * * * *